United States Patent
Hasegawa et al.

(10) Patent No.: US 9,502,922 B2
(45) Date of Patent: Nov. 22, 2016

(54) CHARGING APPARATUS

(71) Applicant: Panasonic Corporation, Osaka (JP)

(72) Inventors: Yu Hasegawa, Kanagawa (JP);
Masanobu Kanaya, Kanagawa (JP);
Yukio Iijima, Kanagawa (JP);
Kazunori Yamada, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 227 days.

(21) Appl. No.: 14/005,881

(22) PCT Filed: Feb. 13, 2013

(86) PCT No.: PCT/JP2013/000771
§ 371 (c)(1),
(2) Date: Sep. 18, 2013

(87) PCT Pub. No.: WO2013/128815
PCT Pub. Date: Sep. 6, 2013

(65) Prior Publication Data
US 2014/0070765 A1 Mar. 13, 2014

(30) Foreign Application Priority Data

Feb. 29, 2012 (JP) ................................. 2012-044027
Sep. 6, 2012 (JP) ................................. 2012-195860

(51) Int. Cl.
*H02J 7/02* (2016.01)
*H01M 10/46* (2006.01)

(52) U.S. Cl.
CPC .............. *H02J 7/025* (2013.01); *H01M 10/46* (2013.01); *H01M 2220/20* (2013.01)

(58) Field of Classification Search
CPC ....................................................... H01J 7/025
USPC ........................................................ 320/108
See application file for complete search history.

(56) References Cited

U.S. PATENT DOCUMENTS

| 2009/0160790 A1 | 6/2009 | Fukushima et al. |
| 2010/0315038 A1 | 12/2010 | Terao et al. |

(Continued)

FOREIGN PATENT DOCUMENTS

| CN | 101329607 A | 12/2008 |
| CN | 201830037 A | 5/2011 |

(Continued)

OTHER PUBLICATIONS

International Search Report for PCT/JP2013/000771 dated May 7, 2013.

(Continued)

*Primary Examiner* — Thuan Do
(74) *Attorney, Agent, or Firm* — Pearne & Gordon LLP

(57) ABSTRACT

A charging apparatus is provided that avoids a reduction in the strength of radio waves or a magnetic field used by a charging target device having a wireless communication function and reduces an influence on the radio waves or magnetic field. In this apparatus, position detection section (201) detects a position of power reception coil (251) of charging target device (150) placed on charging table (101). Power transmission coil (208) is made close to power reception coil (251) and transmits electric power. Coil moving mechanism (207) brings power transmission coil (208) close to the position of power reception coil (251) that is detected by position detection section (201).

12 Claims, 16 Drawing Sheets

(56) References Cited

U.S. PATENT DOCUMENTS

2011/0009057 A1 1/2011 Saunamaki
2012/0235636 A1* 9/2012 Partovi ............... H02J 7/025
   320/108

FOREIGN PATENT DOCUMENTS

| EP | 2302756 A1 | 3/2011 |
| JP | 2006-166570 A | 6/2006 |
| JP | 2010-093723 A | 4/2010 |
| JP | 2011-4474 A | 1/2011 |
| JP | 2011-083057 A | 4/2011 |
| JP | 2011-181769 A | 9/2011 |
| JP | 2011-259534 A | 12/2011 |
| JP | 2012-038887 A | 2/2012 |
| WO | 2007-090168 A2 | 8/2007 |

OTHER PUBLICATIONS

Search Report for Chinese Patent Application No. 2013800008666 dated Mar. 4, 2015.
Supplementary European Search Report for Application No. 13754191.8-1804/2696467 PCT/JP2013000771.

* cited by examiner

CHARGING APPARATUS

TECHNICAL FIELD

The present disclosure relates to a charging apparatus on which a device including therein a secondary battery is placed, and which transmits electrical power by an electromagnetic induction action to charge the secondary battery, the device being a charging target.

BACKGROUND ART

Patent Literature (hereinafter, referred to as "PTL") 1 discloses a configuration in which a power reception coil is embedded in a device to be charged, and a charging table that detects positions of a power transmission coil and the power reception coil is provided in a charging apparatus that transmits electrical power.

PTL 2 discloses a contactless charging apparatus that uses a contactless charging method to charge a cellular telephone including a non-contact-type near field communication unit such as a non-contact IC card, Bluetooth (registered trademark), or infrared communication.

CITATION LIST

Patent Literatures

PTL 1
Japanese Patent Application Laid-Open No. 2011-4474
PTL 2
Japanese Patent Application Laid-Open No. 2011-83057

SUMMARY OF INVENTION

Technical Problem

The present disclosure provides a charging apparatus that is effective for charging a device equipped with a wireless communication function, while reducing an influence on radio waves for communications performed by the device to be charged.

Solution to Problem

A charging apparatus according to an aspect of the present disclosure is a charging apparatus that transmits electrical power to a charging target device by electromagnetic induction to charge a secondary battery of the charging target device, the charging apparatus including: a position detection section that detects a position of a power reception coil of the charging target device placed on the charging apparatus; and an attenuation prevention section that prevents attenuation of radio waves or a magnetic field generated around the charging apparatus.

Advantageous Effects of Invention

The charging apparatus according to the present disclosure is effective for charging a device to be charged that is equipped with a wireless communication function, while reducing the influence on radio waves for communications performed by the device to be charged.

DESCRIPTION OF EMBODIMENTS

Embodiments will be described in detail hereunder with reference to the accompanying drawings as appropriate. However, a more detailed description than is necessary may be omitted. For example, in some cases a detailed description of well known matters or a duplicate description regarding a substantially identical configuration may be omitted. Such omission is to prevent unnecessary redundancy in the description, and to facilitate understanding by those skilled in the art.

Note that the inventors provide the accompanying drawings and the following description in order for those skilled in the art to adequately understand the embodiments and do not intend to limit the subject matter of the invention disclosed in the appended claims by the accompanying drawings.

Embodiment 1

First, Embodiment 1 will be described.

Figure 1:
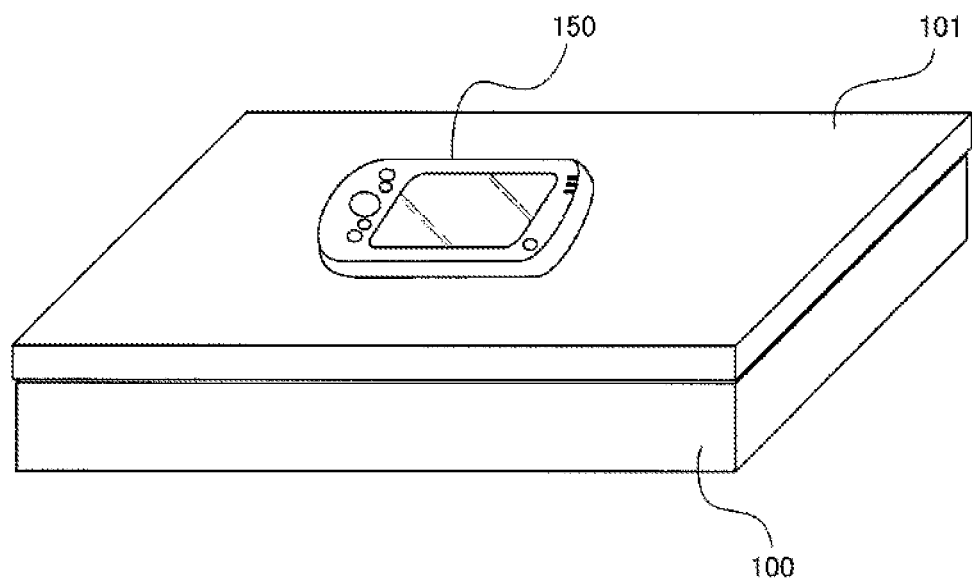
FIG. 1 is an external view that illustrates an example of how a non-contact charging apparatus and a cellular telephone according to Embodiment 1 are provided.

FIG. 1 is an external view illustrating an example of how non-contact charging apparatus 100 and cellular telephone 150 according to Embodiment 1 are provided. FIG. 1 illustrates a state in which cellular telephone 150 is placed on charging table 101 that constitutes the upper face of non-contact charging apparatus 100. In this state, non-contact charging apparatus 100 utilizes non-contact power transmission by means of an electromagnetic induction effect to perform so-called "non-contact charging" by supplying electrical power to a secondary battery of cellular telephone 150 as a device to be charged (hereinafter, referred to as "charging target device"). That is, non-contact charging is performed by placing cellular telephone 150 on charging table 101 of non-contact charging apparatus 100 or bringing cellular telephone 150 near to charging table 101 of non-contact charging apparatus 100.

Figure 2:
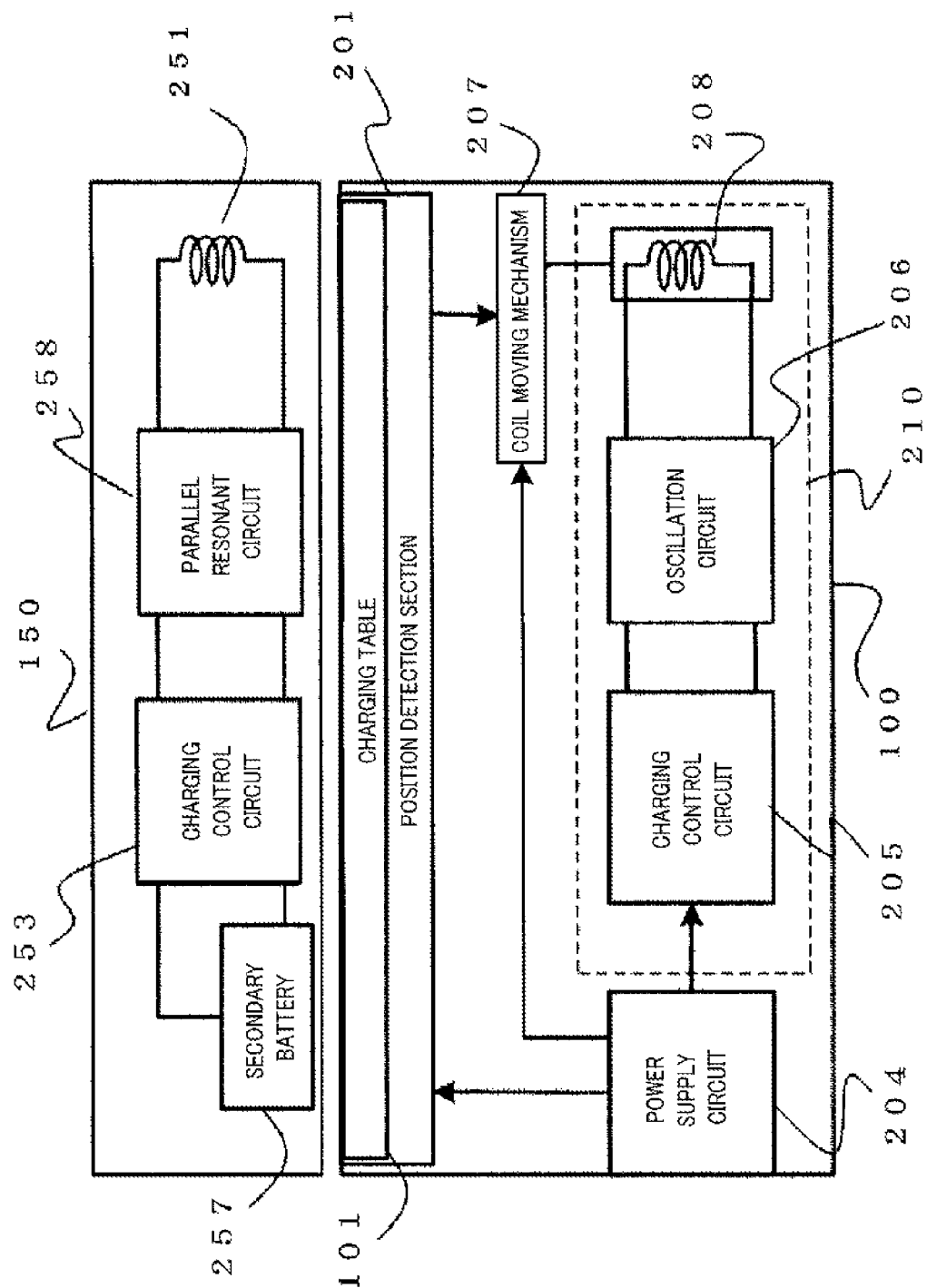
FIG. 2 is a block diagram that illustrates the respective internal configurations of the non-contact charging apparatus and the cellular telephone according to Embodiment 1.

FIG. 2 is a block diagram that illustrates the respective internal configurations of non-contact charging apparatus 100 and cellular telephone 150. As shown in FIG. 2, position detection section 201 having a plurality of coils for detecting a position of cellular telephone 150 placed on charging table 101 is disposed at an inner surface of charging table 101. Consequently, charging table 101 has physical characteristics equivalent to a metal plate with respect to high-frequency waves. That is, when cellular telephone 150 as a charging target device is placed on charging table 101, a high-frequency current that is produced by radio waves (radio waves generated around cellular telephone 150) used by cellular telephone 150 to perform wireless communication flows through the coils of position detection section 201, which causes a loss of energy of the radio waves. Such a loss causes a reduction in the strength of the radio waves used by cellular telephone 150 to perform wireless communication.

In the present embodiment, a reduction in the strength of radio waves used by cellular telephone 150 that is placed on charging table 101 of non-contact charging apparatus 100 is avoided. For this purpose, as shown in FIG. 2, non-contact charging apparatus 100 includes charging table 101, power supply circuit 204, position detection section 201, non-contact charging circuit section 210, and coil moving mechanism 207. Further, cellular telephone 150 is an electronic device that includes a communication unit capable of wireless communication using a specific frequency band, and also includes power reception coil 251, secondary battery 257, parallel resonant circuit 258, and charging control circuit 253.

Each component of non-contact charging apparatus 100 will be described hereunder. Power supply circuit 204 converts electrical power supplied to non-contact charging apparatus 100 from an external power source such as a commercial power source or a battery mounted in a vehicle into a form that is used by non-contact charging apparatus 100. Position detection section 201 detects the position of cellular telephone 150 placed on charging table 101. Note that, the term "position of cellular telephone 150" refers, more precisely, to the position of power reception coil 251 above the surface on charging table 101.

Non-contact charging circuit section 210 supplies electrical power in a non-contact manner to cellular telephone 150. Non-contact charging circuit section 210 includes charging control circuit 205, oscillation circuit 206, and power transmission coil 208. Charging control circuit 205 generates a high-frequency current through oscillation circuit 206 to cause the high-frequency current to flow through power transmission coil 208. When a high-frequency current flows through power transmission coil 208 in the state shown in FIG. 1, an induced electromotive force is generated in power reception coil 251 of cellular telephone 150. Note that charging control circuit 205 may also have a charge detection function that detects a charging state of secondary battery 257 of cellular telephone 150 and determine when charging is completed.

Coil moving mechanism 207 brings power transmission coil 208 close to the position of cellular telephone 150 detected by position detection section 201, along charging table 101. Coil moving mechanism 207 includes an X-axis servo motor that moves power transmission coil 208 in an X-axis direction of the surface constituted by charging table 101, and a Y-axis servo motor that moves power transmission coil 208 in a Y-axis direction of the aforementioned surface.

Figure 3:
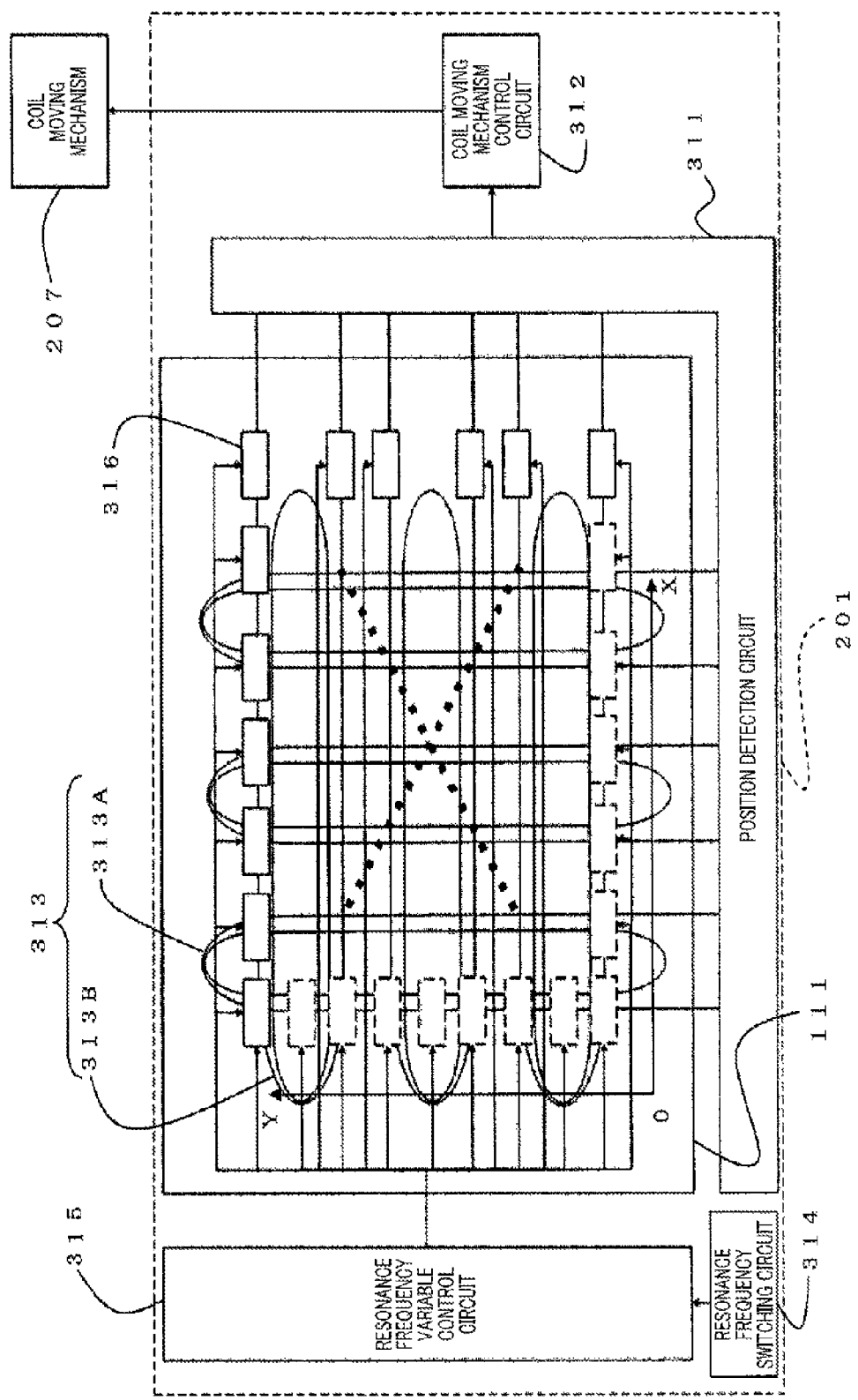
FIG. 3 is a block diagram that illustrates the internal configuration of a position detection section included in the non-contact charging apparatus according to Embodiment 1.

FIG. 3 is a block diagram that illustrates the internal configuration of position detection section 201 included in non-contact charging apparatus 100. As shown in FIG. 3, position detection section 201 includes position detection coils 313, BEFs 316, position detection circuit 311, coil moving mechanism control circuit 312, resonance frequency switching circuit 314, and resonance frequency variable control circuit 315.

Position detection coils 313 are a plurality of rows of coils that are disposed at predetermined intervals on the inner surface of charging table 101. Position detection coils 313 include a plurality of X-axis detection coils 313A that detect positions of power transmission coil 208 of non-contact charging circuit section 210 and power reception coil 251 of cellular telephone 150 in the X-axis direction, and a plurality of Y-axis detection coils 313B that detect positions of power transmission coil 208 and power reception coil 251 in the Y-axis direction. Note that intervals between the adjacent detection coils for each axis are each smaller than the external diameter of power reception coil 251. The position of power reception coil 251 can be accurately detected by making the aforementioned intervals narrow in this manner.

BEFs (band-elimination filters) 316 that are each constituted by an LC parallel resonant circuit are provided between the coils of position detection coils 313 at intervals of ½ a wavelength or less in terms of electrical length with respect to the frequency of radio waves used by cellular telephone 150 for wireless communication. Therefore, at the resonance frequency of BEFs 316, a band-stop filter function reducing the influence on the frequency band used by cellular telephone 150 for wireless communication acts effectively. Each BEF 316 constitutes a circuit in which the resonance frequency can be varied by control from resonance frequency variable control circuit 315.

Figure 4:
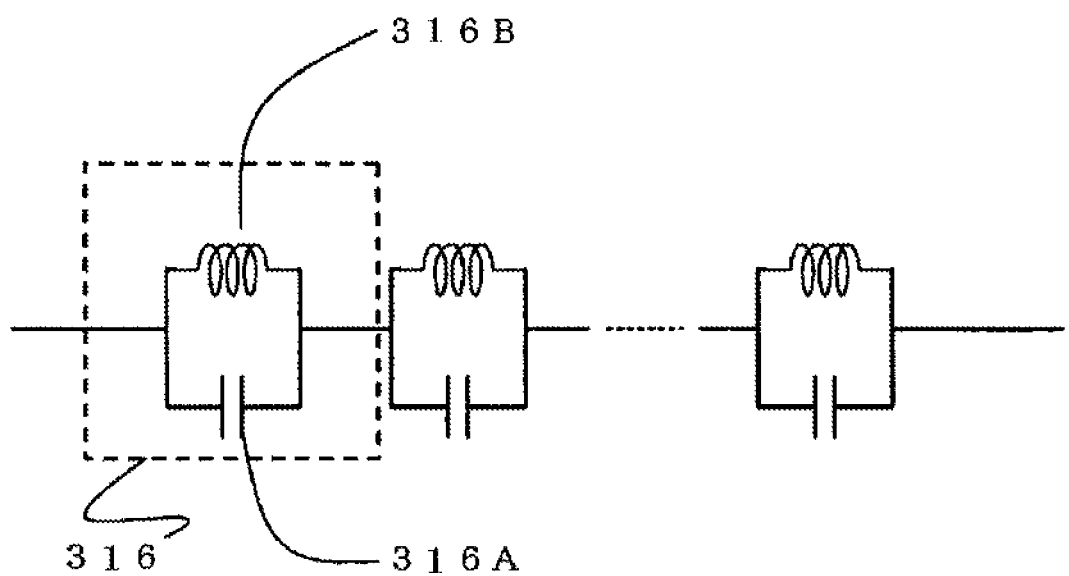
FIG. 4 illustrates an example of the circuit configuration of a BEF according to Embodiment 1.

FIG. 4 illustrates an example of the circuit configuration of BEF 316. The resonance frequency of BEF 316 depends on the product of the capacitance value of capacitor 316A and the inductance value of coil 316B. Accordingly, control of the resonance frequency of BEF 316 is performed by controlling the capacitance value and the inductance value.

Figure 5:
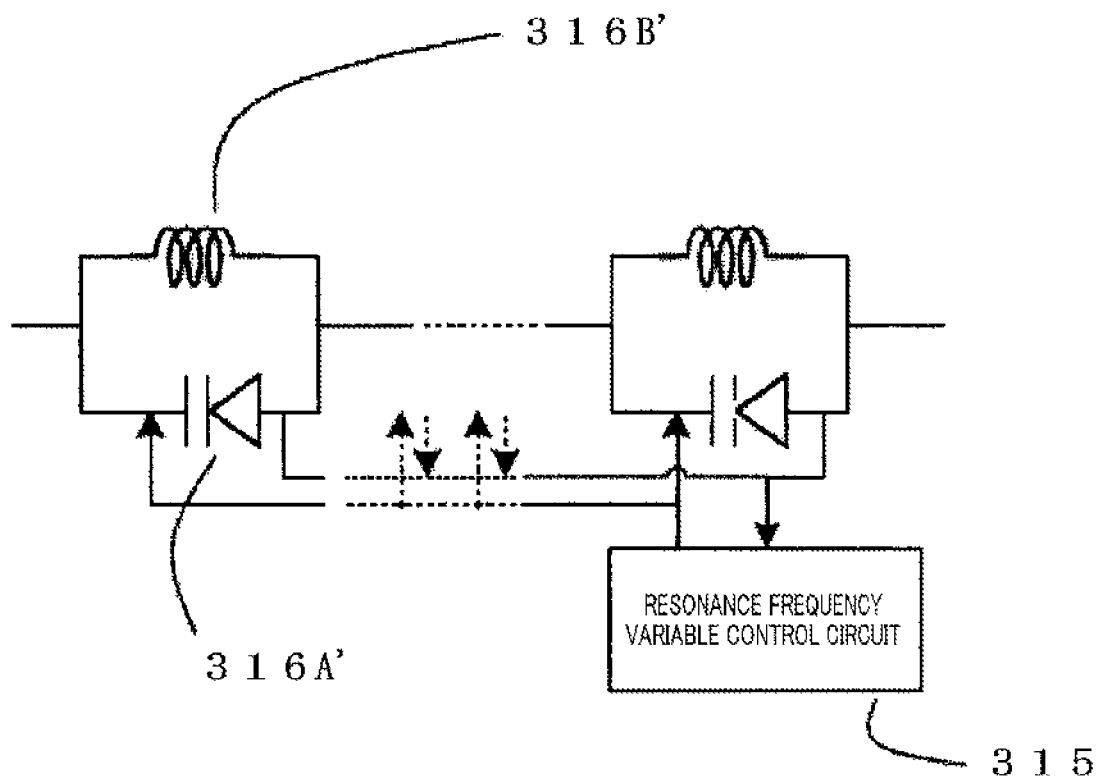
FIG. 5 illustrates another example of the circuit configuration of the BEF according to Embodiment 1.

FIG. 5 illustrates another example of the circuit configuration of BEF 316. In the example shown in FIG. 5, a capacitance element included in BEF 316 is variable capacitance capacitor 316A'. The capacitance can be controlled by applying a reverse voltage to variable capacitance capacitor 316A'. Accordingly, by controlling the voltage applied to variable capacitance capacitor 316A' of all BEFs 316 of position detection section 201, resonance frequency variable control circuit 315 can change the resonance frequency of BEFs 316. Therefore, disposing only one each of coil 316B' and variable capacitance capacitor 316A' makes it possible to realize BEFs 316 in which the resonance frequency is variable and which includes a smaller number of components.

Figure 6:
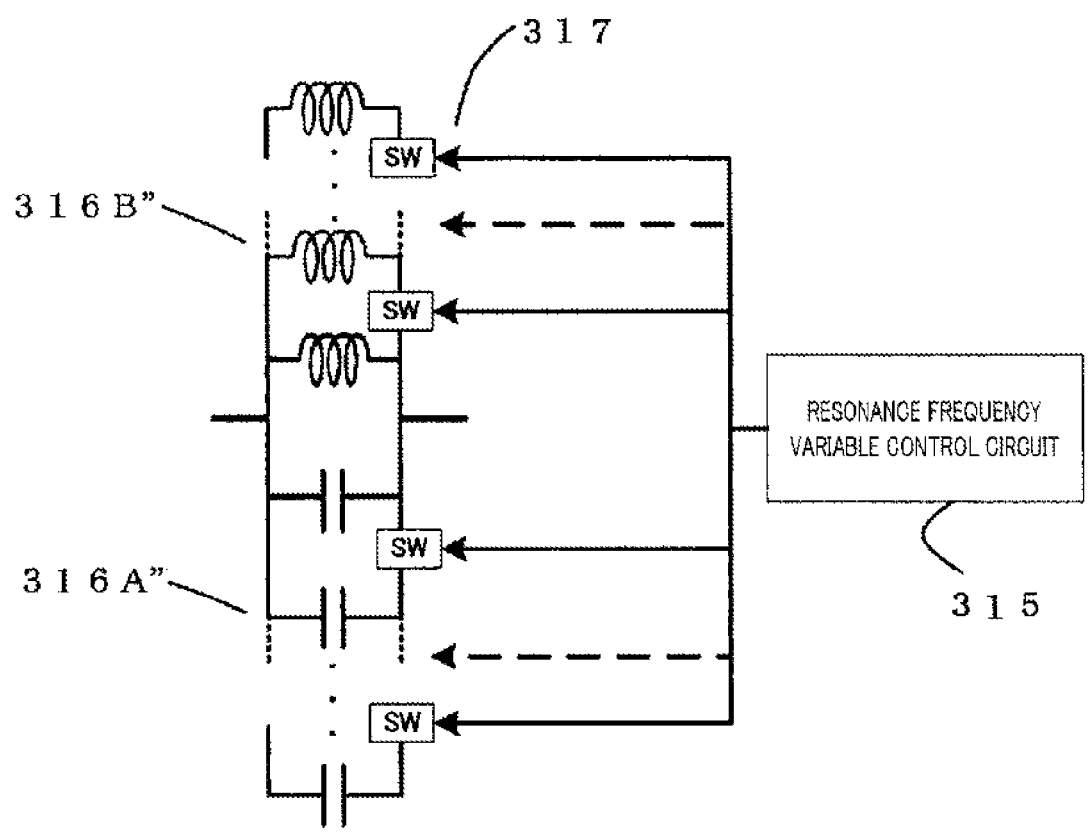
FIG. 6 illustrates a yet another example of the circuit configuration of the BEF according to Embodiment 1.

FIG. 6 illustrates a yet another example of the circuit configuration of BEF 316. In the example shown in FIG. 6, a plurality of capacitors 316A" and coils 316B" are disposed in parallel, and the resonance frequency of BEF 316 can be controlled by resonance frequency variable control circuit 315 controlling on and off states of switch 317. According to this configuration, although the number of components increases compared to the foregoing examples, it is possible to control the resonance frequency with even higher accuracy because both the capacitance value and the inductance value can be controlled.

Position detection circuit 311 excites parallel resonant circuit 258 of cellular telephone 150 with pulse signals outputted from position detection coils 313, and receives an echo signal from power reception coil 251 of cellular telephone 150 to detect the position of power reception coil 251. The level of the echo signal from power reception coil 251 fluctuates according to the relative positions of position detection coils 313 and power reception coil 251. Therefore, position detection circuit 311 can detect the position of cellular telephone 150 on charging table 101 based on the relative distance to each position detection coil 313 that outputs a pulse signal.

Coil moving mechanism control circuit 312 controls coil moving mechanism 207 in accordance with the position of power reception coil 251 detected by position detection circuit 311. That is, coil moving mechanism control circuit 312 performs control of the servo motors in the respective axial directions, which constitute coil moving mechanism 207.

Resonance frequency switching circuit 314 is configured to instruct resonance frequency variable control circuit 315 to determine a resonance frequency so as to perform control relating to an operation that changes the resonance frequency of BEFs 316 in response to switching of an input switch that is performed manually. Note that the purpose of changing the resonance frequency of BEFs 316 is to reduce the influence on a frequency band used by cellular telephone 150 for wireless communication, by means of the resonance frequency of BEFs 316.

Alternatively, in a case where resonance frequency switching circuit 314 is equipped with a communication function, an ID of each frequency band used by cellular telephone 150 may be preset in cellular telephone 150, and resonance frequency switching circuit 314 may acquire an ID by performing wireless communication with cellular telephone 150, and may issue instructions to change the resonance frequency of BEFs 316 to conform to the frequency that corresponds to this ID.

In accordance with an instruction from resonance frequency switching circuit 314, resonance frequency variable control circuit 315 changes either or both of the capacitance value and the inductance value of BEFs 316 to control the resonance frequency of BEFs 316.

The above described charging control circuit 205, coil moving mechanism control circuit 312, and resonance frequency variable control circuit 315 are implemented by such as a microcomputer that executes a computer program in which operation processing is described. That is, using a CPU, a ROM, and a RAM of the microcomputer, the CPU executes a computer program that is stored in the ROM, while using the RAM as a working space. In non-contact charging apparatus 100, charging control circuit 205, coil moving mechanism control circuit 312, and resonance frequency control circuit 315 may be implemented by means of the same microcomputer.

Figure 7:
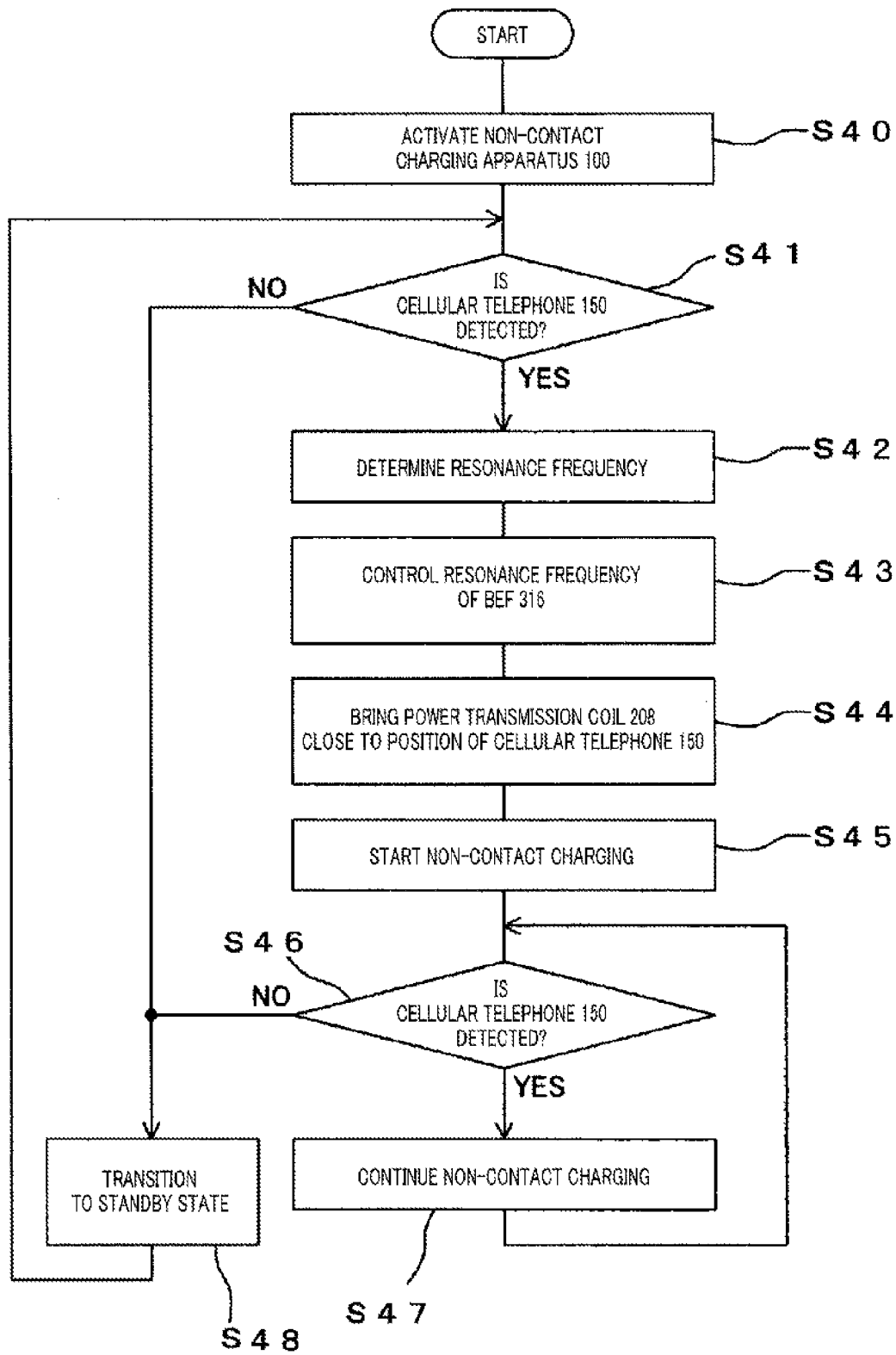
FIG. 7 is a flowchart illustrating operations from detection of a cellular telephone until conducting non-contact charging that are performed by the non-contact charging apparatus according to Embodiment 1.

Hereunder, operations from detection of cellular telephone 150 until conducting non-contact charging that are performed by non-contact charging apparatus 100 of the present embodiment will be described referring to FIG. 7. As shown in FIG. 7, when electrical power supply to non-contact charging apparatus 100 from an external power source starts, power supply circuit 204 performs electrical power conversion for non-contact charging apparatus 100, and non-contact charging apparatus 100 is activated (step S40). Alternatively, after power is supplied from an external power source, non-contact charging apparatus 100 may be activated by means of a manual switch or the like provided in non-contact charging apparatus 100.

Next, position detection section 201 determines whether or not cellular telephone 150 is present on charging table 101, and if cellular telephone 150 is present on charging table 101, position detection section 201 detects the position thereof (step S41). Detection of the position of cellular telephone 150 is performed by position detection circuit 311 exciting parallel resonant circuit 258 of cellular telephone 150 with pulse signals outputted from position detection coils 313, and receiving an echo signal from power reception coil 251. If the position of cellular telephone 150 can be detected in step S41, the process advances to step S42. Note that, the term "position of cellular telephone 150" refers more precisely to the position of power reception coil 251 above the surface of charging table 101. In contrast, if the position of cellular telephone 150 cannot be detected in step S41, the process advances to step S48. In step S48, non-contact charging apparatus 100 transitions to a standby state.

In step S42, resonance frequency switching circuit 314 determines the resonance frequency of BEFs 316 in conformity with the frequency band of radio waves used by cellular telephone 150 for wireless communication. Next, resonance frequency variable control circuit 315 controls either or both of the capacitance value and the inductance value of BEFs 316 so that the resonance frequency of BEFs 316 becomes the frequency determined in step S42 (step S43).

Next, coil moving mechanism control circuit 312 controls coil moving mechanism 207 based on the position of cellular telephone 150 detected in step S41 to bring power transmission coil 208 close to the position of power reception coil 251 of cellular telephone 150 (step S44). Subsequently, non-contact charging circuit section 210 causes a high-frequency current to flow through power transmission coil 208 to generate an induced electromotive force in power reception coil 251 by an electromagnetic induction action between power transmission coil 208 and power reception coil 251, thereby starting charging of secondary battery 257 of cellular telephone 150 (step S45).

Next, position detection section 201 determines whether or not cellular telephone 150 is present on charging table 101, and if cellular telephone 150 is present on charging table 101, detects the position of cellular telephone 150 (step S46). If the position of cellular telephone 150 can be detected in step S46, the process advances to step S47 and continues non-contact charging. In contrast, if the position of cellular telephone 150 cannot be detected in step S46, the process advances to step S48 where non-contact charging apparatus 100 transitions to a standby state.

As described above, non-contact charging apparatus 100 of the present embodiment causes the resonance frequency of BEFs 316 disposed on the inner surface of charging table 101 to conform to the frequency of radio waves used by cellular telephone 150 for wireless communication. For this reason, a band-stop filter for the aforementioned frequency is configured in BEFs 316. As a result, cellular telephone 150 is charged while a reduction in the strength of radio waves at the aforementioned frequency is limited.

Forming a band-stop filter for a frequency band used by cellular telephone 150 for wireless communication in position detection coils 313 prevents a high-frequency current produced by radio waves of the frequency band used by cellular telephone 150 from flowing through position detection coils 313. Consequently, a loss of energy of the radio waves used by cellular telephone 150 can be avoided.

Thus, according to the charging apparatus of the present embodiment, since BEFs are used as an attenuation prevention section that prevents attenuation of radio waves of a specific frequency that are generated around the charging apparatus itself, such as in the vicinity of the charging table, non-contact charging can be performed while avoiding a reduction in the strength of radio waves used by the charging target device.

Embodiment 2

Next, Embodiment 2 will be described. Note that components that are the same as in Embodiment 1 are denoted by the same reference symbols, and a detailed description of such components is omitted.

In the state shown in FIG. 1, in a case where cellular telephone 150 includes a near field communication (NFC) function, non-contact charging apparatus 100 performs near field communication (hereunder, referred to as "NFC communication") that is a kind of wireless communication that utilizes an electromagnetic induction effect.

Various kinds of information communication can be performed by NFC communication between cellular telephone 150 and an external device connected to non-contact charging apparatus 100.

Various types of contents are conceivable as the contents of such communication. For example, when a car navigation apparatus is connected as an external device to non-contact charging apparatus 100, the destination of the car navigation can be set by transmitting destination information set in cellular telephone 150 to the car navigation apparatus by NFC communication.

However, since the contents of communication by NFC communication between cellular telephone 150 and an external device depart from the purpose of the present embodiment, a detailed description of the communication contents is omitted herein.

A carrier wave of 13.56 MHz is used for NFC communication, and transmission and reception of data is performed by utilizing a magnetic field that is generated in an antenna coil. Consequently, an antenna coil that generates a magnetic field of a frequency of 13.56 MHz is required in the charging table or in the vicinity of the charging table in order to perform communication by NFC.

The charging apparatus of the present embodiment is provided with an NFC function by allocating one coil among the large number of position detection coils disposed inside the charging table for dual use as an antenna coil to be used for NFC.

Accordingly, since a position detection coil is used in a dual manner as an antenna coil, an NFC function can be provided in a charging table of the related art without newly adding an antenna for NFC in the charging table.

Therefore, while the charging apparatus of the present embodiment may of course be put to good use indoors such as in an ordinary household or office where it is easy to secure a location for disposing objects and appliances, the charging apparatus of the present embodiment can be advantageously provided in an automobile or transport aircraft in which space is limited.

Figure 8:
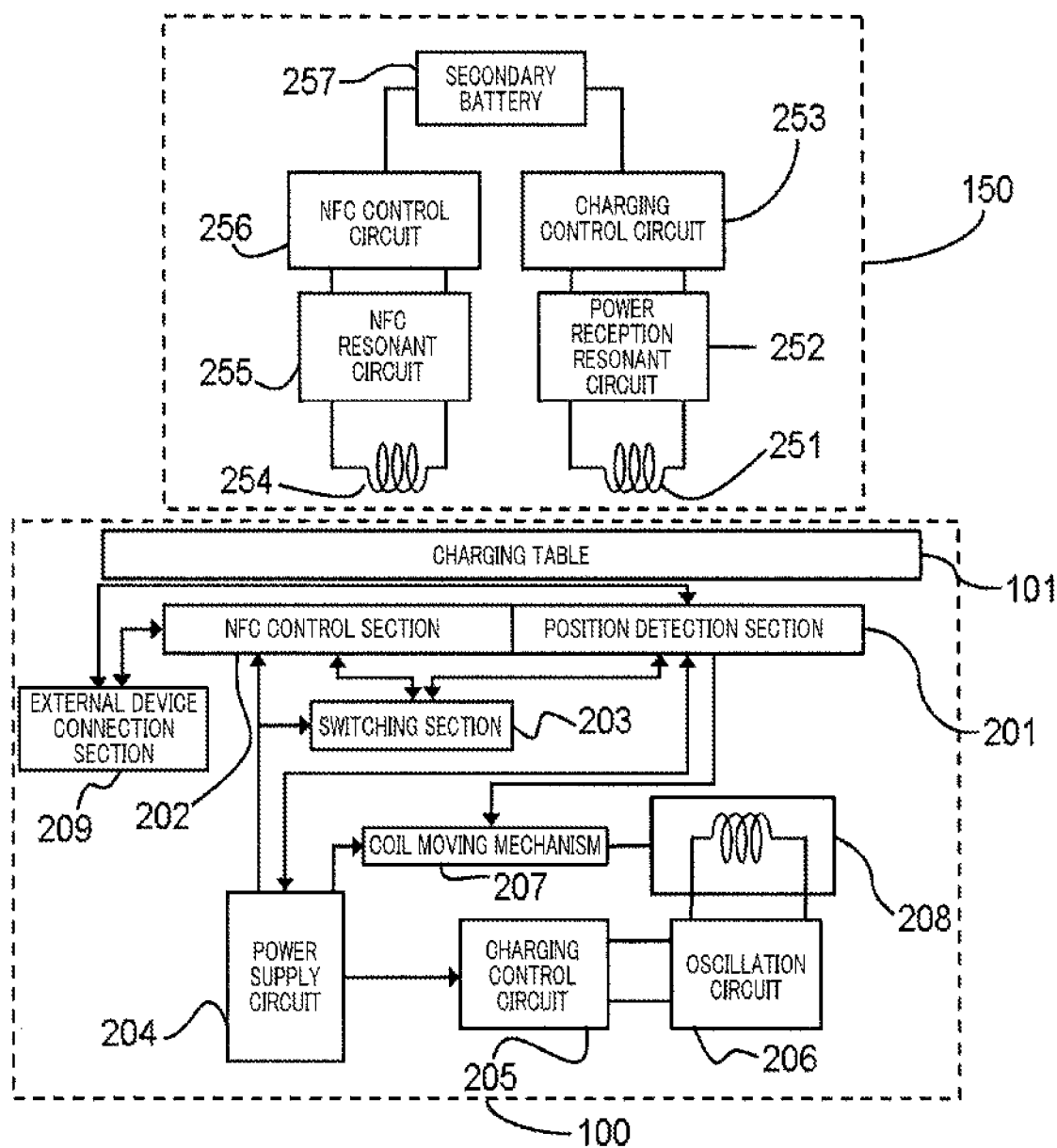
FIG. 8 is a block diagram that illustrates the respective internal configurations of a non-contact charging apparatus and a cellular telephone according to Embodiment 2.

FIG. 8 is a block diagram that illustrates the internal configurations of non-contact charging apparatus 100 and cellular telephone 150, respectively.

As shown in FIG. 8, non-contact charging apparatus 100 includes a charging table on a surface side of non-contact charging apparatus 100 on which cellular telephone 150 is placed.

Position detection section 201 that includes a plurality of coils for detecting the position of cellular telephone 150 that is placed on charging table 101, and NFC control section 202 for conducting NFC communication with cellular telephone 150 are disposed on the inner surface side of charging table 101 (inner side of the apparatus).

In addition, in order to use one coil among the plurality of coils of position detection section 201 as a position detection coil and an NFC coil, switching section 203 is provided for switching the coil according to each function.

In addition, non-contact charging apparatus 100 also includes power supply circuit 204, charging control circuit 205, oscillation circuit 206, coil moving mechanism 207, power transmission coil 208, and external device connection section 209.

External device connection section 209 connects non-contact charging apparatus 100 and the aforementioned external device that is to be connected to non-contact charging apparatus 100. That is, the external device performs bi-directional communication with position detection section 201 and NFC control section 202 through external device connection section 209.

Further, cellular telephone 150 is an electronic device that has a communication unit capable of wireless communication using a specific frequency, and includes power reception coil 251, power reception resonant circuit 252, charging control circuit 253, NFC antenna coil 254 as a near field communication antenna, NFC resonant circuit 255, NFC control circuit 256, and secondary battery 257.

Hereunder, each component of non-contact charging apparatus 100 will be described.

Figure 9:
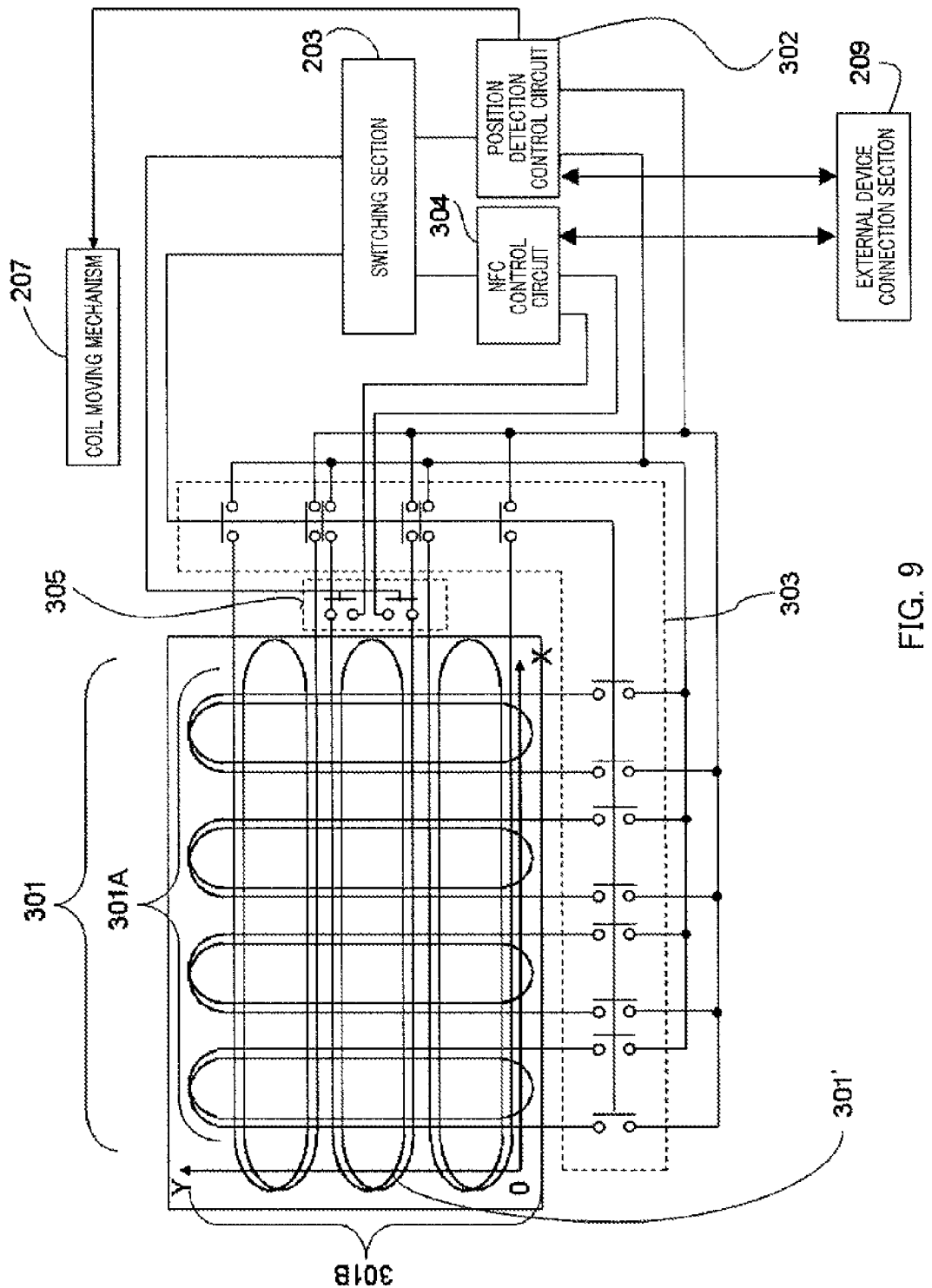
FIG. 9 is a block diagram that illustrates the internal configuration of a position detection section, an NFC control section, and a switching section that are included in the non-contact charging apparatus according to Embodiment 2.

FIG. 9 is a block diagram that illustrates the internal configurations of position detection section 201 and NFC control section 202 as a near field communication control section that are included in non-contact charging apparatus 100.

As shown in FIG. 9, position detection section 201 includes position detection coils 301, position detection control circuit 302, and switches 303 that are controlled by switching section 203, and NFC control section 202 includes NFC control circuit 304 and switches 305 that are controlled by switching section 203.

Further, position detection section 201 and NFC control section 202 include position detection coils 301, position detection control circuit 302, coil moving mechanism 207, NFC control circuit 304, switching section 203, and switches 303 and switches 305 that are controlled by switching section 203.

Position detection coils 301 are a plurality of rows of coils that are disposed at predetermined intervals on the inner surface of charging table 101.

The position detection coils 301 include a plurality of X-axis direction position detection coils 301A that detect the position in the X-axis direction of power transmission coil 208 and power reception coil 251 of cellular telephone 150, and a plurality of Y-axis direction position detection coils 301B that detect the position in the Y-axis direction of power transmission coil 208 and power reception coil 251.

Note that intervals between the adjacent detection coils for each axis are each smaller than the external diameter of the power reception coil. The position of power reception coil 251 can be accurately detected by making the aforementioned intervals narrow in this manner.

In this case, according to the present embodiment, one coil among the plurality of position detection coils 301 to be disposed is caused to have dual functions by also utilizing the coil as an NFC antenna coil (coil denoted by 301' in FIG. 9).

As shown in FIG. 9, the plurality of position detection coils 301 to be disposed in charging table 101 are disposed in both the X-axis direction and Y-axis direction of charging table 101, and the position detection coils in the axial directions intersect with each other.

Accordingly, there are also a plurality of position detection coils (301A in FIG. 9) that are orthogonal to position detection coil 301' that also serves as an NFC antenna coil (hereunder, referred to as "NFC dual-purpose position detection coil").

In general, for NFC, the antenna coil of a transmission side generates a magnetic field of 13.56 MHz. When a magnetic flux of the magnetic field passes through the antenna coil on the reception side, an induced electromotive force is generated in the antenna coil on the reception side and communication is performed utilizing this electrical power.

Accordingly, a magnetic field strength that is sufficient to generate an electrical power that is necessary in order to activate an IC mounted on the reception side is required for the magnetic field that is generated in a coil on the transmission side.

In addition, an induced electromotive force that is generated in the antenna coil on the reception side is proportional to the strength of the magnetic field that passes through the antenna coil on the reception side.

Since a plurality of X-axis direction position detection coils 301A intersect with NFC dual-purpose position detection coil 301', magnetic flux of 13.56 MHz that is generated by NFC dual-purpose position detection coil 301' also passes through the intersecting plurality of X-axis direction position detection coils 301A.

Figure 10:
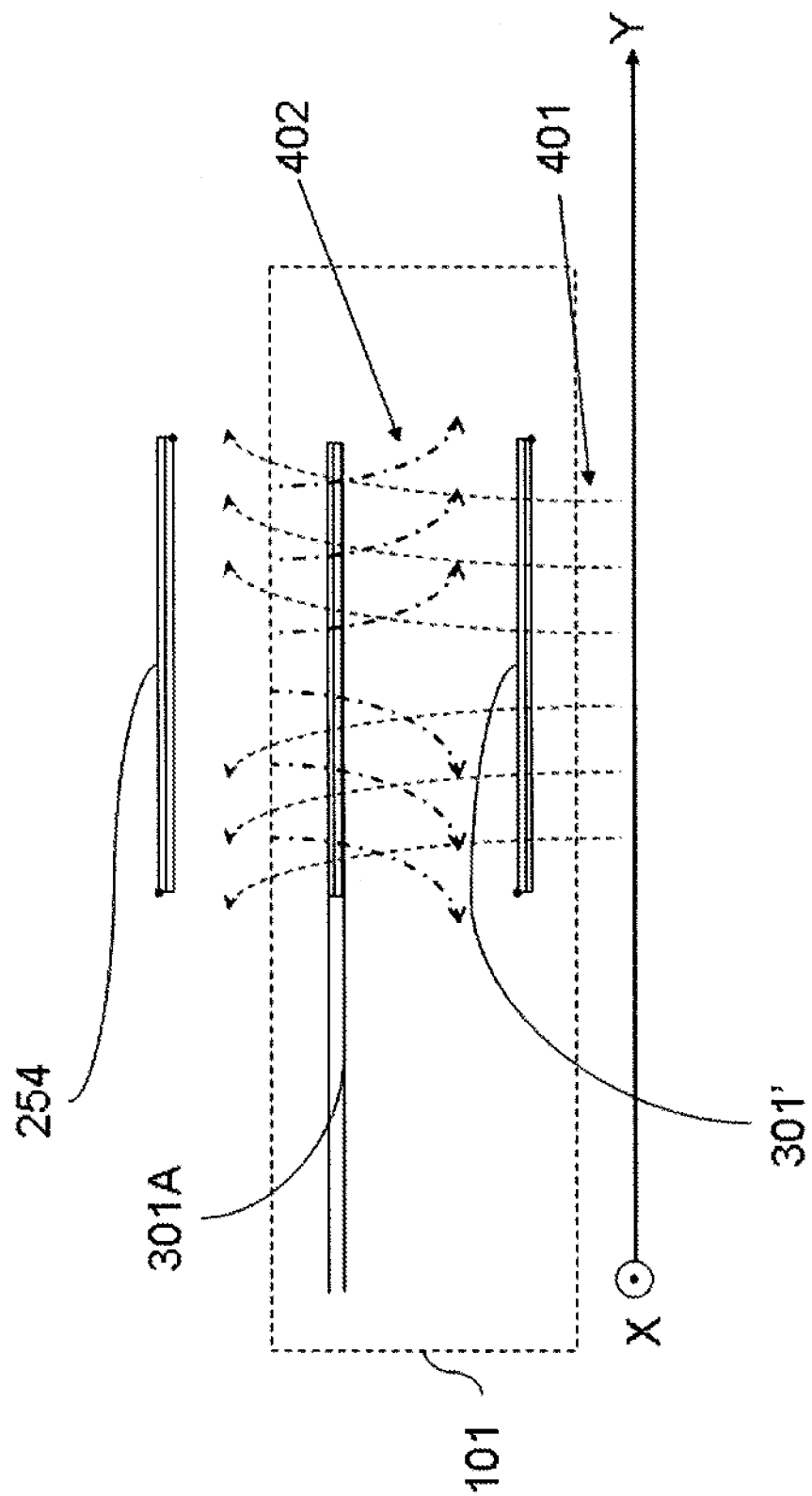
FIG. 10 is a schematic diagram of a magnetic field and a demagnetizing field that are generated in position detection coils according to Embodiment 2.

Therefore, as shown in FIG. 10, the plurality of X-axis direction position detection coils 301A that intersect with NFC dual-purpose position detection coil 301' receive magnetic field (magnetic field generated around its own apparatus) 401 generated by NFC dual-purpose position detection coil 301', and generate a magnetic field around the coils by means of an electromagnetic induction effect. The direction of this magnetic field is the opposite direction to that of the magnetic field generated by NFC dual-purpose position detection coil 301' (hereunder, referred to as "demagnetizing field 402").

Magnetic field 401 that originally is necessary for NFC communication is attenuated by demagnetizing field 402. Because of the attenuation of magnetic field 401, the induced electromotive force that is generated in NFC antenna coil 254 on the reception side also decreases.

When the electromotive force generated in the circuit on the reception side decreases, the communication becomes unstable and communication errors arise in the communication with NFC control circuit 256 of cellular telephone 150, and communication cannot be performed in some cases.

Figure 11:
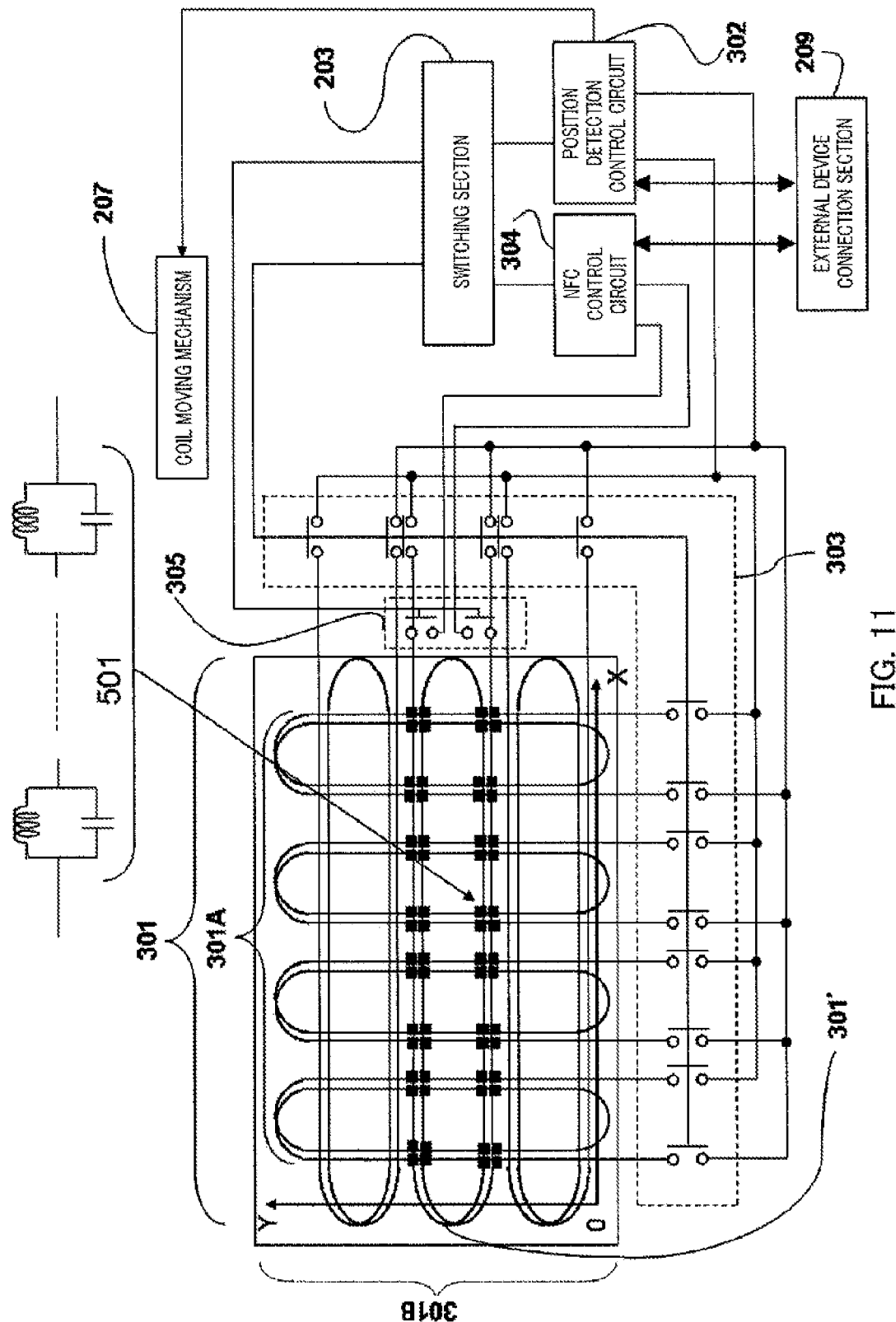
FIG. 11 is a block diagram that illustrates how BEFs to be arranged to position detection coils according to Embodiment 2 are implemented.

Therefore, according to the non-contact charging apparatus of the present embodiment, in order to prevent attenuation of magnetic field 401 that is required for NFC communication, as shown in FIG. 11, as an attenuation prevention section, BEFs (band-elimination filters) 501 constituted by an LC parallel resonant circuit are connected in series to the plurality of X-axis direction position detection coils 301A that intersect with NFC dual-purpose position detection coil 301'.

In the example illustrated in FIG. 11, although BEFs 501 are disposed at places at which NFC dual-purpose position detection coil 301' and X-axis direction position detection coils 301A intersect with each other, the places at which BEFs 501 are disposed are not necessarily limited to these positions, and as long as BEFs 501 are connected in series at optional places on coils 301 other than NFC dual-purpose position detection coil 301', any configuration can be employed.

The BEFs are LC parallel resonant circuits that attenuate only a predetermined frequency on the circuit. Therefore, the predetermined frequency attenuated by the BEFs is set to the same frequency as the carrier wave of 13.56 MHz that is used for NFC.

Figure 12:
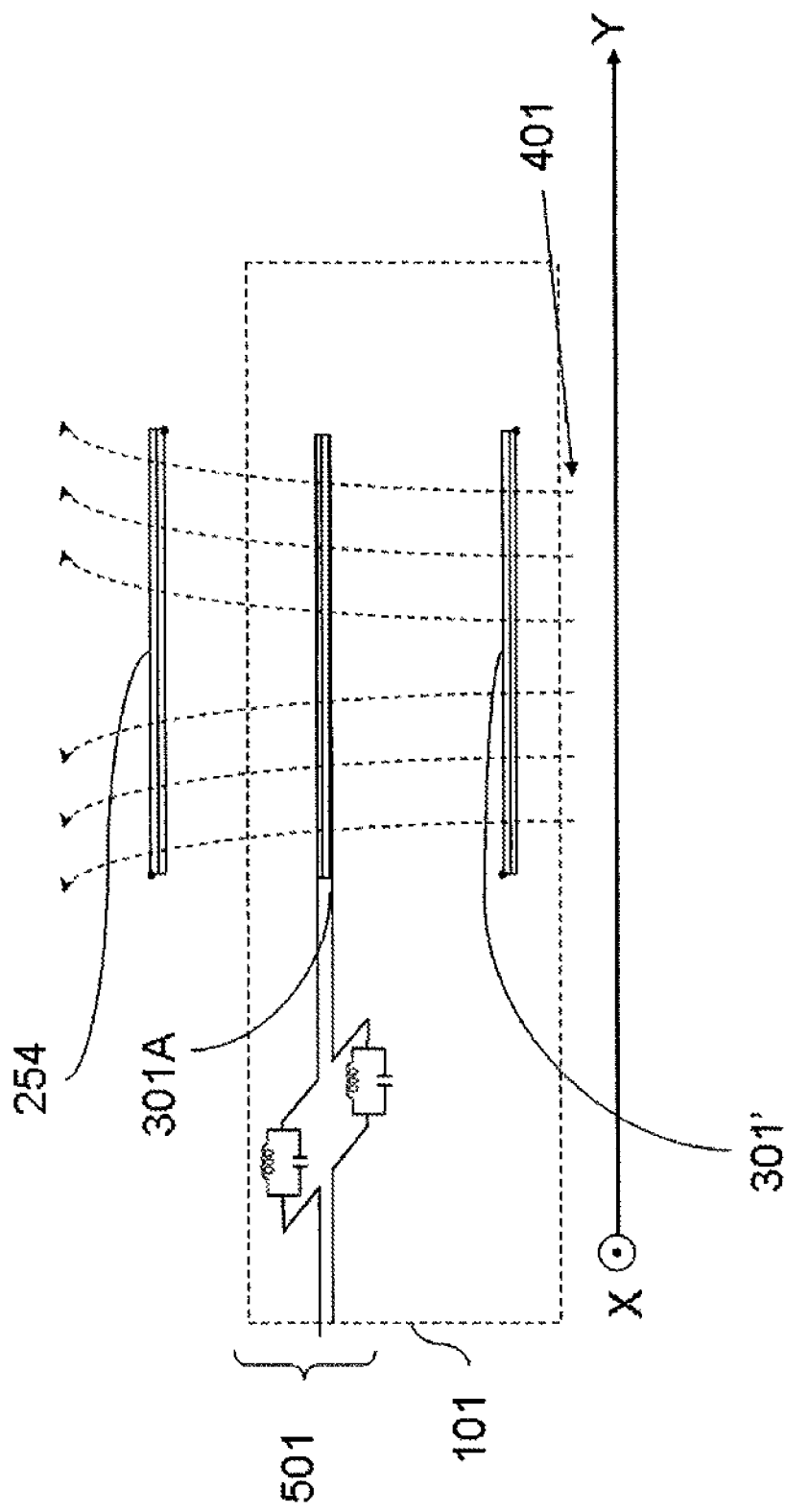
FIG. 12 illustrates a magnetic field generated by a position detection coil according to Embodiment 2, and an effect that is caused by inserting a BEF.

As a result, as shown in FIG. 12, it is possible to avoid generation of a high-frequency current even when the magnetic field of 13.56 MHz generated by the NFC antenna coil passes through X-axis direction position detection coils 301A to which BEFs 501 are serially connected, and also to avoid generation of a demagnetizing field.

According to the present embodiment, for convenience, an example has been described in which, with respect to NFC dual-purpose position detection coil 301' that is a Y-axis direction position detection coil, BEFs are connected in series only to the plurality of X-axis direction position detection coils 301A intersecting with NFC dual-purpose position detection coil 301'.

However, BEFs may alternatively be inserted to Y-axis direction position detection coils 301B that are disposed close to or overlapping with NFC dual-purpose position detection coil 301'.

More specifically, although in the examples shown in FIG. 9 and FIG. 11, a configuration is exemplified in which a plurality of coils that are parallel to each other are aligned without overlapping, arranging these coils so as to overlap (so that the regions enclosed by the coils overlap) can improve the accuracy of detecting the position of power reception coil 251 of cellular telephone 150.

In this case (case in which coils overlap), inserting BEFs to an optional coil (overlapping coil) of Y-axis direction position detection coils 301B excluding NFC dual-purpose position detection coil 301' makes it possible to avoid generation of a demagnetizing field by the optional coil (overlapping coil).

At this time, the larger the area of a coil of coils 301A or 301B that overlaps with NFC dual-purpose position detection coil 301' is, the greater the effect of the generation of demagnetizing field when the BEFs are inserted. Accordingly, it is preferable to select a coil to which to insert BEFs in accordance with the arrangement of position detection coils 301 (taking into consideration the degree of overlapping with the dual-purpose coil).

In addition, although FIG. 11 illustrates an example in which a plurality of BEFs are disposed on a single coil, the purpose of inserting the BEFs is to inhibit (attenuate) the flow of a current of 13.56 MHz that is used for NFC on coils other than NFC dual-purpose position detection coil 301'.

Thus, as long as this purpose can be satisfied, there is no necessity to limit the number of BEFs that are disposed on a coil.

Hereunder, an implementation state when a position detection coil is actually caused to serve a dual purpose as an NFC antenna coil will be described.

Figure 13:
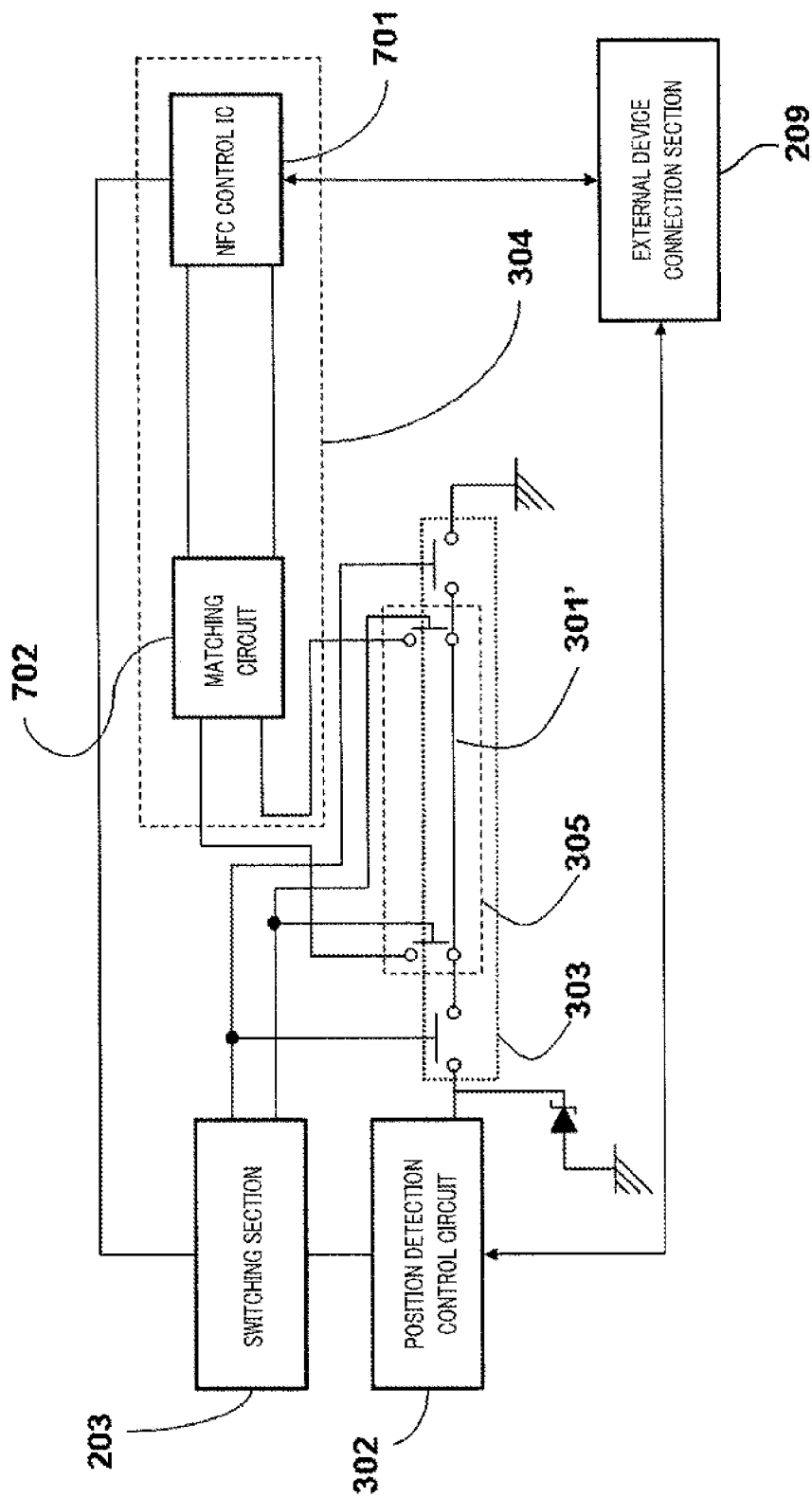
FIG. 13 illustrates a circuit configuration around a position detection circuit according to Embodiment 2.

According to the non-contact charging apparatus of the present embodiment, the configuration shown in FIG. 13 is adopted so that NFC dual-purpose position detection coil 301' handles a frequency for position detection of power reception coil 251 and a frequency for NFC communication as different frequencies.

As shown in FIG. 13, the function of NFC dual-purpose position detection coil 301' can be switched by controlling switches 303 and 305 that are connected to switching section 203.

NFC dual-purpose position detection coil 301' has a function as a position detection coil when switching section 203 turns on switch 303 and turns off switch 305 (this state is referred to as "state 1").

When NFC dual-purpose position detection coil 301' functions as a position detection coil, NFC dual-purpose position detection coil 301' functions as one of a plurality of position detection coils that excite power reception resonant circuit 252 of cellular telephone 150 with pulse signals outputted from position detection control circuit 302 and receive a magnetic field (hereunder, referred to as "echo signal") that is re-emitted from power reception coil 251 to thereby detect the position of power reception coil 251 of cellular telephone 150.

In this case, the level of the echo signal from power reception coil 251 fluctuates according to the relative positions of position detection coils 301 and power reception coil 251.

Therefore, position detection control circuit 302 can detect the position of cellular telephone 150 on charging table 101 based on the level of the echo signal that differs according to the relative distance between each position detection coil 301 that outputs pulse signals and power reception coil 251.

Accordingly, when NFC dual-purpose position detection coil 301' is caused to function as a position detection coil, NFC dual-purpose position detection coil 301' serves as a path that transmits a pulse signal that causes power reception resonant circuit 252 of cellular telephone 150 to resonate, and transmits an echo signal that is outputted from the power reception coil to position detection control circuit 302.

Next, when switching section 203 turns off switch 303 and turns on switch 305, NFC dual-purpose position detection coil 301' has a function as an NFC antenna coil (this state is referred to as "state 2").

NFC control circuit 304 includes NFC control IC 701 that controls and outputs a carrier wave of 13.56 MHz when performing desired communication by NFC, and matching circuit 702 that performs impedance matching with respect to a path between NFC control IC 701 and NFC dual-purpose position detection coil 301'.

NFC uses a carrier wave of 13.56 MHz for communication. Accordingly, impedance matching is performed in matching circuit 702, and the impedance of matching circuit 702 is previously adjusted so as to resonate at the frequency of the carrier wave that is outputted from NFC control IC 701.

In the present embodiment, passive components such as a capacitor and a coil implemented in matching circuit 702 are used for impedance matching.

NFC control circuit 304 and NFC control circuit 256 that is mounted in cellular telephone 150 perform NFC communication through respective antenna coils thereof.

NFC control IC 701 and NFC control circuit 256 that is mounted in cellular telephone 150 perform communication through respective antenna coils thereof, and perform desired operations in accordance with the communication result. Switching section 203 controls switches 303 and 305 to switch between state 1 and state 2.

Figure 14:
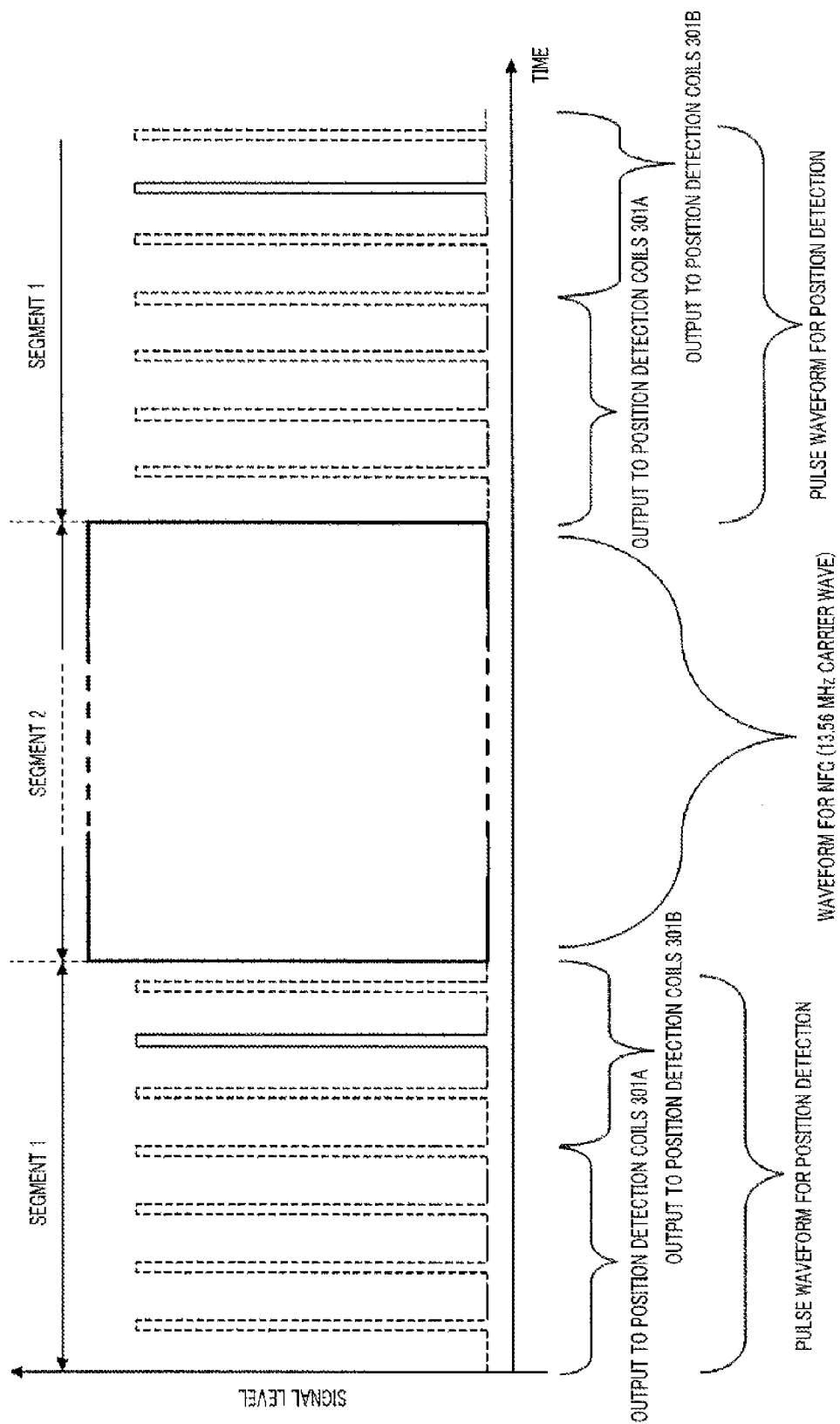
FIG. 14 illustrates waveforms outputted to position detection coils according to Embodiment 2.

FIG. 14 illustrates the relationship between the time axis and signals outputted to NFC dual-purpose position detection coil 301' when switches 303 and 305 are controlled to switch between state 1 and state 2.

In segment 1 in FIG. 14, NFC dual-purpose position detection coil 301' enters state 1 and a pulse wave for detecting the position of power reception coil 251 installed in cellular telephone 150 is outputted to position detection coils 301.

A signal that is outputted to NFC dual-purpose position detection coil 301' is shown in FIG. 14. A pulse waveform for position detection that is shown by a dashed line in segment 1 is illustrated by, for convenience, showing a pulse waveform that is outputted to X-axis direction position detection coils 301A and Y-axis direction position detection coils 301B in a similar manner to the position detection coils shown in FIG. 9.

During the period of segment 1, in order to detect the position coordinates of power reception coil 251 that is installed in non-contact charging apparatus 100, pulse signals are output to each position detection coil included in X-axis direction position detection coils 301A and Y-axis direction position detection coils 301B by performing switching control of the switches of position detection control circuit 302.

Note that although the example shown in FIG. 14 exemplifies a method that outputs pulse signals in sequence to X-axis direction position detection coils 301A and Y-axis direction position detection coils 301B, the present embodiment is not necessarily limited to this method.

For example, a method can be considered that, with respect to segment 1, first outputs a pulse signal to X-axis direction position detection coils 301A, and only when power reception coil 251 is detected, then outputs a pulse signal to Y-axis direction position detection coils 301B.

That is, a method may also be adopted that outputs a pulse signal to X-axis direction position detection coils 301A, and ends segment 1 unless an echo signal is detected. In this case, the time period required for segment 1 can be shortened when power reception coil 251 is not placed on the charging table.

In a case where position coordinates of power reception coil 251 are detected after a pulse signal is outputted to position detection coils 301, or in a case where no echo signal is detected and position detection control circuit 302 is thus determined that power reception coil 251 is not placed on non-contact charging apparatus 100, switching section 203 turns switch 303 off and turns switch 305 on to thereby transition to segment 2 (state 2).

Next, segment 2 shown in FIG. 14 shows a state at a time that the NFC dual-purpose antenna coil transitions to state 2.

In segment 2, NFC communication is performed between NFC control circuit 304 and NFC control circuit 256 mounted in cellular telephone 150 using a carrier wave of 13.56 MHz.

In segment 2, NFC control IC 701 performs polling for a predetermined period to detect a device that is a target of NFC communication. NFC control circuit 256 mounted in cellular telephone 150 transmits a response command to NFC control IC 701 by using load modulation of a carrier wave of 13.56 MHz that is sent to NFC control circuit 256.

Accordingly, in segment 2, if this response command is not detected, NFC control IC 701 determines that no NFC function is provided in cellular telephone 150.

When NFC control IC 701 determines that no NFC function is provided in cellular telephone 150, or at a time point that the NFC communication with NFC control circuit 256 mounted in cellular telephone 150 ends the operation, a transition is made to segment 1 again from segment 2.

Figure 15:
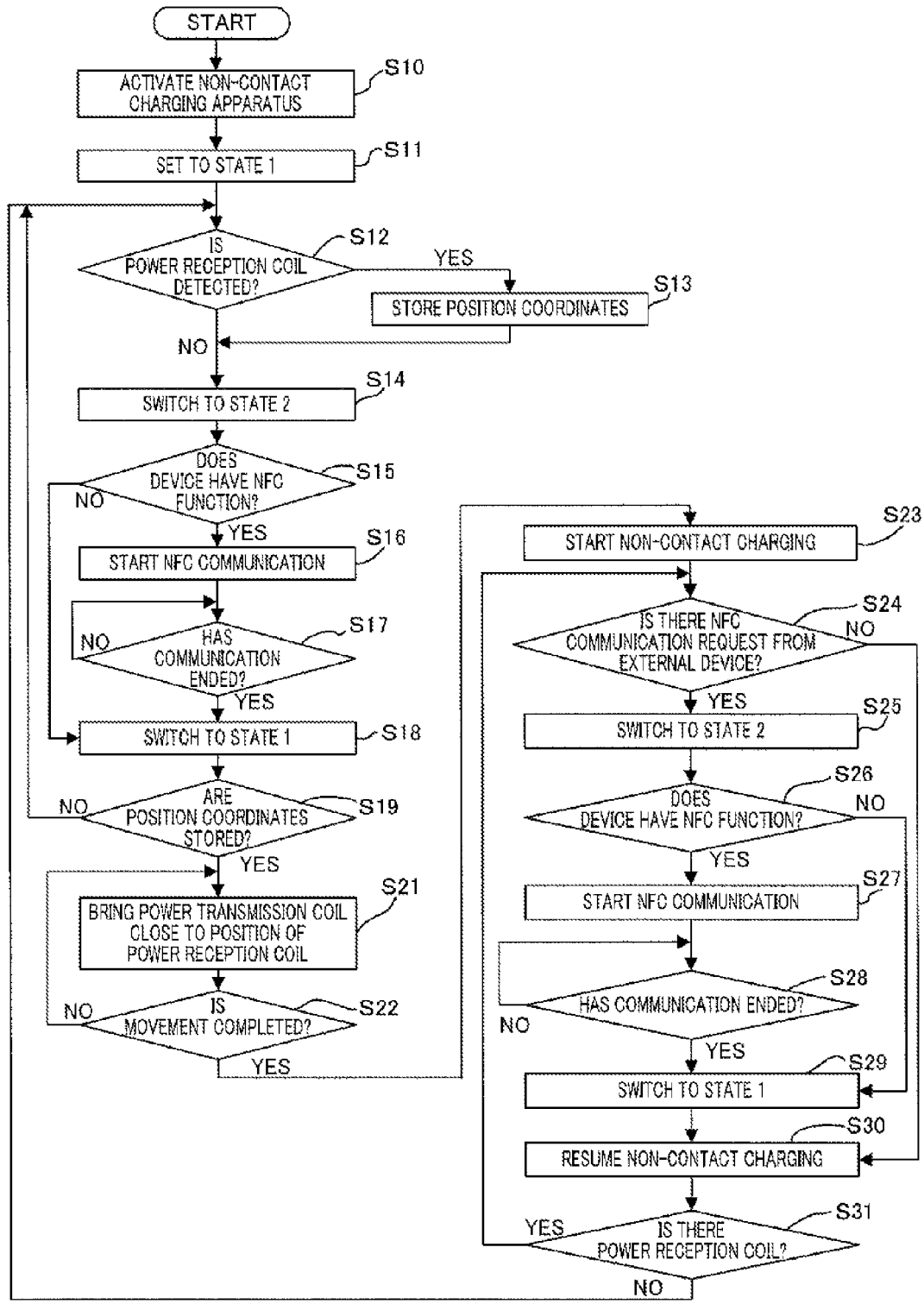
FIG. 15 is a flowchart that illustrates operations from detection of a cellular telephone until conducting non-contact charging and NFC communications that are performed by the non-contact charging apparatus according to Embodiment 2.

Hereunder, operations from detection of cellular telephone 150 until conducting non-contact charging and conducting NFC communication that are performed by non-contact charging apparatus 100 of the present embodiment will be described referring to FIG. 15.

When the supply of electrical power to non-contact charging apparatus 100 from an external power source such as a commercial power source starts, power supply circuit 204 converts the electrical power into a form that is used by non-contact charging apparatus 100, and thus non-contact charging apparatus 100 is activated (step S10).

However, after power is supplied from an external power source, non-contact charging apparatus 100 may alternatively be activated by means of a manual switch or the like provided in non-contact charging apparatus 100.

After activation of non-contact charging apparatus 100, switching section 203 performs control of switches 303 and 305 to cause NFC dual-purpose position detection coil 301' to transition to state 1 (step S11). In the present embodiment, this state is referred to as "initial state."

After transition to state 1, in step S12, position detection section 201 determines whether or not cellular telephone 150 is present on charging table 101 during segment 1.

In step S12, if cellular telephone 150 is present on charging table 101, the position of cellular telephone 150 is detected.

Detection of the position of cellular telephone 150 is performed by position detection section 201 exciting power reception resonant circuit 252 of cellular telephone 150 with pulse signals that are outputted from position detection coils 301 and receiving an echo signal from power reception coil 251.

Note that the term "position of cellular telephone 150" refers more precisely to the position of power reception coil 251 on the surface of charging table 101.

If position detection control circuit 302 determines that power reception coil 251 is placed on charging table as a result of receiving an echo signal (YES in step S12), the position coordinates of power reception coil 251 are stored in a memory provided in the position detection control circuit (step S13).

If no power reception coil is detected in step S12, or after the process in step S13 ends, switching section 203 controls switch 303 and switch 305 so that NFC dual-purpose position detection coil 301' transitions to state 2 (step S14).

After NFC dual-purpose position detection coil 301' transitions to state 2 in step S14, in segment 2, NFC communication is performed between NFC control circuit 304 and NFC control circuit 256 that is mounted in cellular telephone 150.

In segment 2, NFC control IC 701 performs polling for a predetermined period to detect a device that is a target of NFC communication and thereby determines whether or not cellular telephone 150 placed on non-contact charging apparatus 100 is equipped with an NFC function (step S15).

NFC control circuit 256 mounted in cellular telephone 150 transmits a response command to NFC control IC 701 by using load modulation of a carrier wave of 13.56 MHz that is sent to NFC control circuit 256. Accordingly, in segment 2, if this response command is not detected, NFC control IC 701 determines that no NFC function is provided in cellular telephone 150 (NO in step S15).

If NFC control IC 701 determines in step S15 that an NFC function is provided in cellular telephone 150, NFC communication is started (step S16).

After NFC communication is started in step 16, processing to determine whether or not NFC communication ends is continued successively (step S17).

If NFC control IC 701 determines that no NFC function is provided in cellular telephone 150 (NO in step S15), or at a time point that NFC communication with NFC control circuit 256 mounted in cellular telephone 150 ends (YES in step S17), NFC dual-purpose position detection coil 301' transitions to segment 1 again from segment 2 (step S18).

When NFC dual-purpose position detection coil 301' transitions to state 1 again, the flow changes according to whether or not position detection control circuit 302 has detected power reception coil 251 in step S12, that is, whether or not position coordinates of power reception coil 251 are stored in the memory provided in position detection control circuit 302 (step S19).

In step S19, if power reception coil 251 is detected in step S12, the process advances to step S21 in which position detection control circuit 302 controls coil moving mechanism 207 to bring power transmission coil 208 close to the position of power reception coil 251.

If it is determined in step S19 that position coordinates are not stored (NO in step 19), the process returns to the initial state. Accordingly, unless power reception coil 251 is detected. NFC dual-purpose position detection coil 301' repeats the flow between step S12 and step S19.

In step S22, whether or not movement of power transmission coil 208 has ended is determined. If movement has not ended (NO in step S22), the process returns to step S21 to continue movement of power transmission coil 208.

After movement of power transmission coil 208 to the position of power reception coil 251 ends through execution of step S21 and step S22 (YES in step S22), charging control circuit 205 generates a high-frequency current through oscillation circuit 206 and causes the high-frequency current to flow through power transmission coil 208.

When the high-frequency current flows through power transmission coil 208 in the state shown in FIG. 1, an induced electromotive force is generated in power reception coil 251 of cellular telephone 150, and charging starts (step S23).

In addition, it is determined whether or not a request to conduct NFC communication with cellular telephone 150 has sent to non-contact charging apparatus 100 from an external device that is connected to external device connection section 209 during charging (step S24).

If a request to conduct NFC communication is sent from an external device during charging of cellular telephone 150 (YES in step S24), switching section 203 controls switch 303 and switch 305 so that NFC dual-purpose position detection coil 301' transitions to state 2 (step S25).

Operations to be performed in step S26 to step S29 as the flow after transition to state 2 are the same as the operations in step S15 to step S18 that are described above.

Note that a configuration may also be adopted that, while performing the processing in step S26 to step S29, performs processing that stops the charging operation of power transmission coil 208, or performs control that increases the distance of power transmission coil 208 from NFC dual-purpose position detection coil 301', or performs both the processing to stop charging and the movement control with respect to power transmission coil 208.

Adopting such a configuration makes it possible to reduce the influence that a magnetic field generated by power transmission coil 208 has on a magnetic field that is used for NFC communication.

However, in this case, it is necessary to perform processing that moves power transmission coil 208 to the position of power reception coil 251 during a period from the end of NFC communication to before step S30.

Further, a configuration may be adopted in which, if position detection control circuit 302 does not detect a device that is a target for NFC communication in step S26, information to the effect that a target device is not detected is transmitted from position detection control circuit 302 to the external device via external device connection section 209.

After the flow from step S26 to step S29, the charging operation is continued (step S30). Thus, it is possible to conduct NFC communication even during charging of cellular telephone 150.

Finally, in step S31, if power reception coil 251 is no longer present on power transmission coil 208 during the charging operation, charging control circuit 205 stops the charging operation. Accordingly, charging control circuit 205 repeatedly executes the processing from step S24 to step S31 while performing the charging operation.

When charging control circuit 205 stops the charging operation in step S31, the processing returns to the initial state and an operation to detect power reception coil 251 is executed.

By means of the above flow, a charging operation and NFC communication with respect to cellular telephone 150 that is placed on non-contact charging apparatus 100 are performed.

By means of the present flow, it is possible to perform a charging operation also with respect to "a cellular telephone provided with a non-contact charging function, but not provided with an NFC function."

Further, it is possible to conduct NFC communication by repeating the operations from step S12 to step S19 also with respect to "a cellular telephone provided with an NFC function, but not provided with a charging function."

By means of the above operations, it is possible for non-contact charging apparatus 100 to execute a desired operation depending on a function provided in a cellular telephone that is placed on the charging table.

Further, the processing flow that is illustrated herein is only an example of implementation of the present embodiment. Thus, it is also possible to adopt a configuration in which a user uses a manual switch or the like mounted in the charging apparatus to switch between state 1 and state 2, depending on a function provided in the cellular telephone that is placed on the charging table.

Figure 16:
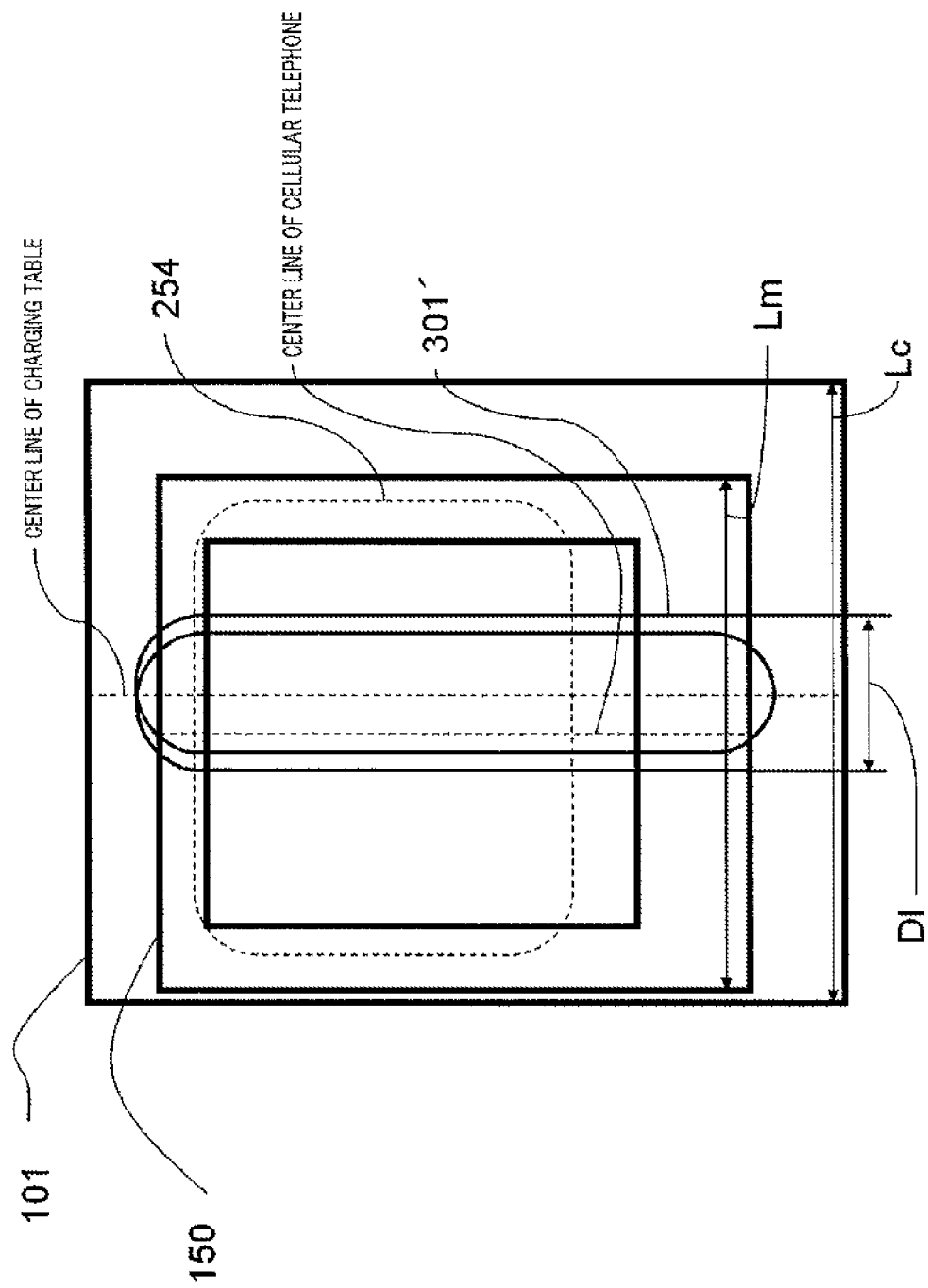
FIG. 16 illustrates relative sizes of a position detection coil and a charging table according to Embodiment 2.

Next, the size of the charging table of the present embodiment is described using FIG. 16. FIG. 16 illustrates the relative sizes of cellular telephone 150 and charging table 101. In consideration of the fact that the charging table of the present embodiment is mainly used for charging cellular telephones, it is necessary to design the size of the charging table on the assumption that the charging table will be used to charge cellular telephones in various sizes.

Cellular telephones typically have a shape that fits in a geometric frame such as a square or rectangular shape. Therefore, when charging table 101 is formed in a rectangular shape, the relative size of charging table 101 with respect to cellular telephone 150 is important.

The strength of a magnetic field depends on the size of the antenna that generates the magnetic field. Therefore, NFC antenna coil 254 that is mounted in cellular telephone 150 is disposed so as to be as large a size as possible inside the casing of cellular telephone 150.

In the example shown in FIG. 16, a situation is assumed in which NFC antenna coil 254 of cellular telephone 150 is disposed so as to overlap with the center of cellular telephone 150.

NFC communication is performed by utilizing an induced electromotive force produced by a magnetic field that is generated by one antenna passing through another antenna.

Accordingly, the larger that a region at which antennas that perform communication overlap with each other is, the greater the degree to which the strength of the magnetic field increases and the sensitivity rises.

As shown in FIG. 16, length Lc in a short-side direction of charging table 101 is made larger than length Lm in a short-side direction of cellular telephone 150, and length Lc in the short-side direction of charging table 101 is made smaller than the sum of length Lm in the short-side direction of cellular telephone and interval D1 of NFC dual-purpose position detection coil 301'.

However, charging table 101 and NFC dual-purpose position detection coil 301' are disposed so as to be in parallel with each other in their long-side direction.

Further, "interval D1" of NFC dual-purpose position detection coil 301' can be described in another way as "the width in the short-side direction (short-side direction of charging table) of a magnetic field excited by NFC dual-purpose position detection coil 301'," in the example shown in FIG. 16. "Interval D1" is the distance between one straight line in the longitudinal direction of NFC dual-purpose position detection coil 301' and another straight line that faces the one straight line.

For practical purposes, it is preferable for interval D1 of the NFC dual-purpose position detection coil to be considered according to what width (or length) in the short-side direction of cellular telephone 150 is occupied by a magnetic field that is excited by NFC dual-purpose position detection coil 301'.

Setting the size of the charging table in this manner makes NFC antenna coil 254 of cellular telephone 150 always overlap with half or more of NFC dual-purpose position detection coil 301'.

Accordingly, by defining the size of the charging table relative to the size of the cellular telephone as described above, and defining a position detection coil that is disposed at the center of the plurality of Y-axis direction position detection coils 301B that are disposed in the short-side direction of the charging table as NFC dual-purpose position detection coil 301', no matter which position of the charging table a cellular telephone is placed at, antennas that perform NFC communication overlap with each other and allow communication to be performed.

That is, both a charging function and an NFC function can be realized in a compatible manner irrespective of the position of the cellular telephone. As described above, according to the present embodiment, BEFs (band elimination filters) are serially connected in a plurality of position detection coils that intersect with a position detection coil that is caused to function as an NFC antenna coil, and a frequency that is attenuated using the BEFs is made the same frequency as a carrier wave of 13.56 MHz that is used for NFC.

Therefore, even if a magnetic field of 13.56 MHz generated by the NFC antenna coil passes through a position detection coil in which BEFs are disposed, a high-frequency current of 13.56 MHz to be generated on the position detection coils is avoided.

Accordingly, it is also possible to avoid a demagnetizing field to be generated from position detection coils by an electromagnetic induction effect by means of a high-frequency current.

That is, according to the charging apparatus of the present embodiment, it is possible to avoid the generation of a demagnetizing field that is to be generated around position detection coils that intersect with a position detection coil that is caused to function as an antenna coil for NFC communication, and also possible to realize both a charging function and NFC communication in a compatible manner.

Note that a carrier wave that is used for near field communication (NFC communication) is not limited to 13.56 MHz, and the charging apparatus of the present embodiment can be adapted to an antenna of a device that performs communication utilizing electromagnetic induction.

As described in the above, the charging apparatus of the present embodiment is effective for charging a charging target device that has a wireless communication function, while reducing the influence on radio waves used by the charging target device.

Note that, with respect the foregoing description, the contents described in Embodiments 1 and 2 may be optionally combined. According to this variation, the effect of optionally combining Embodiments 1 and 2 can be obtained.

The disclosures of the specifications, the drawings, and the abstracts included in Japanese Patent Application No. 2012-044027 filed on Feb. 29, 2012 and Japanese Patent Application No. 2012-195860 filed on Sep. 6, 2012 are incorporated herein by reference in their entirety.

INDUSTRIAL APPLICABILITY

The charging apparatus of the present disclosure is useful as a non-contact charging apparatus of a charging target device that has a wireless communication function or the like. Specifically, the charging apparatus of the present disclosure is useful as a non-contact charging apparatus that charges a cellular telephone or a smartphone or the like.

REFERENCE SIGNS LIST

100 Non-contact charging apparatus
101 Charging table
150 Cellular telephone (example of a charging target device)
201 Position detection section
202 NFC control section
203 Switching section
204 Power supply circuit
205 Charging control circuit
206 Oscillation circuit
207 Coil moving mechanism
208 Power transmission coil
209 External device connection section
210 Non-contact charging circuit section
251 Power reception coil
252 Power reception resonant circuit
253 Charging control circuit
254 NFC antenna coil
255 NFC resonant circuit
256 NFC control circuit
257 Secondary battery
258 Parallel resonant circuit
301 Position detection coil
301A X-axis direction position detection coil
301B Y-axis direction position detection coil
301' NFC dual-purpose position detection coil
302 Position detection control circuit
303 Switch
304 NFC control circuit
305 Switch
311 Position detection circuit
312 Coil moving mechanism control circuit
313 Position detection coils
313A X-axis detection coils
313B Y-axis detection coils
314 Resonance frequency switching circuit
315 Resonance frequency variable control circuit
316 BEF
316A, 316A" Capacitor
316A' Variable capacitance capacitor
316B, 316B', 316B" Coil
317 Switch
401 Magnetic field
402 Demagnetizing field
501 BEF
701 NFC control IC
702 Matching circuit
Lc Length in short-side direction of charging table
Lm Length in short-side direction of cellular telephone
D1 Interval of NFC dual-purpose position detection coil

The invention claimed is:

1. A charging apparatus that transmits electrical power to a charging target device by electromagnetic induction to charge a secondary battery of the charging target device, the charging apparatus comprising:
a power transmission coil;
a position detection section that detects a position of a power reception coil of the charging target device placed on the charging apparatus; and
a resonant circuit that prevents attenuation of radio waves or a magnetic field generated around the charging apparatus, and wherein:
the position detection section comprises coils disposed separately from the power transmission coil in a plurality of rows;
the resonant circuit attenuates radio waves or a magnetic field of a predetermined frequency in which the charging target device performs communications with external devices other than the charging apparatus; and
the resonant circuit is provided to the coils of the position detection section.

2. The charging apparatus according to claim 1, wherein
the resonant circuit is an LC parallel resonant circuit provided to the plurality of rows of coils, and
a resonance frequency of the LC parallel resonant circuit is a frequency that is included in a frequency band of radio waves used by the charging target device for wireless communication.

3. The charging apparatus according to claim 2, further comprising
a resonance frequency variable control circuit that changes a resonance frequency of the LC parallel resonant circuit to a predetermined frequency, wherein the resonance frequency variable control circuit changes the predetermined frequency to a frequency included in a frequency band of radio waves used by the charging target device for wireless communication.

4. The charging apparatus according to claim 3, wherein the position detection section further comprises a resonance frequency switching circuit that determines the predetermined frequency, and the resonance frequency variable control circuit controls the resonance frequency of the LC parallel resonant circuit in accordance with an instruction from the resonance frequency switching circuit.

5. The charging apparatus according to claim 4, wherein the resonance frequency switching circuit determines the predetermined frequency in response to switching of an input switch performed by manual operation.

6. The charging apparatus according to claim 2, further comprising:
   a near field communication antenna for near field communications between the charging target device and an external device by electromagnetic induction, wherein
   the near field communication antenna is any one of the plurality of coils of the position detection section.

7. The charging apparatus according to claim 6, further comprising:
   a near field communication control section that is to be connected to the near field communication antenna and that executes near field communication between the charging target device and the external device; and
   a switching section that switches operation between the position detection section and the near field communication control section.

8. The charging apparatus according to claim 4, wherein the resonance frequency switching circuit includes a function to communicate with the charging target device and determines the predetermined frequency by identifying an ID assigned to each frequency used by the charging target device for wireless communication.

9. The charging apparatus according to claim 1, further comprising
   a near field communication antenna for near field communications between the charging target device and an external device by electromagnetic induction, wherein
   the near field communication antenna is any one of the plurality of coils of the position detection section.

10. The charging apparatus according to claim 9, further comprising:
    a near field communication control section that is to be connected to the near field communication antenna and that executes near field communication between the charging target device and the external device; and
    a switching section that switches operation between the position detection section and the near field communication control section.

11. The charging apparatus according to claim 9, further comprising:
    a charging table in which the coils of the position detection section are disposed on an inner surface side of the charging table, and on which the charging target device is to be placed, wherein
    a length in a short-side direction of the charging table is greater than a length in a short-side direction of the charging target device and is less than a sum of the length in the short-side direction of the charging target device and an interval of the near field communication antenna.

12. The charging apparatus according to claim 11, wherein the coils of the position detection section are disposed at predetermined intervals in a plurality of rows in a longitudinal direction and a transverse direction of the charging table, and the coil of the position detection section that is the near field communication antenna is disposed at a center in the short-side direction among the plurality of rows of coils of the position detection section.

* * * * *